(12) United States Patent
Zhang et al.

(10) Patent No.: US 7,492,788 B2
(45) Date of Patent: Feb. 17, 2009

(54) COMMUNICATION OF CONTROL INFORMATION IN WIRELESS COMMUNICATION SYSTEMS

(75) Inventors: Hang Zhang, Nepean (CA); Mo-Han Fong, L'Orignal (CA)

(73) Assignee: Nortel Networks Limited, St. Laurent, Quebec (CA)

( * ) Notice: Subject to any disclaimer, the term of this patent is extended or adjusted under 35 U.S.C. 154(b) by 1332 days.

(21) Appl. No.: 10/179,954

(22) Filed: Jun. 26, 2002

(65) Prior Publication Data

US 2004/0013103 A1    Jan. 22, 2004

Related U.S. Application Data

(60) Provisional application No. 60/342,051, filed on Dec. 19, 2001, provisional application No. 60/301,312, filed on Jun. 27, 2001.

(51) Int. Cl.
  *H04J 3/16* (2006.01)
  *H04J 3/22* (2006.01)
(52) U.S. Cl. .................................... 370/468; 370/545
(58) Field of Classification Search ................ 370/458, 370/468, 498, 441, 335, 545, 329, 331, 395.4; 455/522
See application file for complete search history.

(56) References Cited

U.S. PATENT DOCUMENTS 7,127,247 B2 * 10/2006 Moulsley et al. ............ 455/434
7,190,685 B2 * 3/2007 Das et al. .................... 370/336
2001/0024431 A1 * 9/2001 Koo et al. .................... 370/335
2003/0193915 A1 * 10/2003 Lee et al. .................... 370/335
2004/0017792 A1 * 1/2004 Khaleghi et al. ............ 370/335
2004/0196820 A1 * 10/2004 Hsu et al. .................... 370/342

FOREIGN PATENT DOCUMENTS

WO    0035126    6/2000
WO    0062456    10/2000

OTHER PUBLICATIONS

Sarkar, Sandip and Tiedemann, Edward, "Common Channel Soft Handoff in CDMA2000—The Paging Channel", Jun. 6, 2000, IEEE Transactions on Microwave Theory and Techniques, vol. 48 No. 6, pp. 938-950.*

* cited by examiner

*Primary Examiner*—Aung S Moe
*Assistant Examiner*—Feben Haile

(57) ABSTRACT

A wireless system has a high rate data channel for time multiplexed communications to multiple mobile stations (MSs). Control channels include a forward link common power control channel and reverse link feedback channels for pilot, forward channel quality, and data acknowledgements from each MS. An MS can have an active state for data communications, for which these control channels are used at the full (time slot) rate, or a control hold state, in which acknowledgements are not needed and the others of these control channels can be shared among a plurality of MSs in the control hold state and each using a reduced rate such as ½, ¼, or ⅛ of the full rate. The arrangement can support an increased number of active MSs, facilitating an increased total throughput on the high rate data channel, without increasing system resources for the control channels.

7 Claims, 3 Drawing Sheets

COMMUNICATION OF CONTROL INFORMATION IN WIRELESS COMMUNICATION SYSTEMS

This application claims the benefit of U.S. Provisional Application No. 60/301,312 filed Jun. 27, 2001 and U.S. Provisional Application No. 60/342,051 filed Dec. 19, 2001, the entire contents and disclosure of each of which are hereby incorporated herein by reference.

This invention relates to the communication of control information in wireless communications systems, and is particularly concerned with communication of control information (including feedback, pilot, and any other overhead information) related to supporting high rate packet data communications in a wireless communications system.

BACKGROUND

It is known in wireless communications systems to provide various channels for communications between a base station (BS) and remote stations any one of which may be mobile and accordingly is referred to as a mobile station (MS). Such channels include, for example, both dedicated and shared traffic channels and control channels, for either or both of a forward link from a BS to an MS and a reverse link from an MS to a BS.

In known wireless systems an MS can have individually assigned to it, at call set-up or subsequently, forward and/or reverse dedicated channels for packet data communications, as well as dedicated traffic and dedicated control channels. In order to save battery power, it is known to provide a control hold mode for an active user for which a data buffer has been empty for a period of time. In the control hold mode, the high data rate supplemental channel is released and the forward and reverse dedicated control channels communicate only the pilot and power control signals (i.e. data acknowledgements are not sent) at either a full rate (the time slot rate) or a reduced rate.

In more recently proposed wireless systems there are shared traffic channels, shared control channels, and common power control channels; these known systems do not provide a control hold mode.

In these more recent systems, for example high rate packet data communications are provided on a high rate forward channel, referred to as the forward packet data channel or F-PDCH, which is shared by time division multiplexing among multiple active users and which may for example have a constant RF power. For example, with time slots of 1.25 ms, such a high rate channel may be allocated to different users (MSs) in different time slots. Each such MS is assigned a MAC (medium access control, OSI Layer 2) identifier (MAC_ID) which is transmitted in corresponding time slots on a shared control channel, referred to as a forward packet data control channel or F-PDCCH, to identify the MS for which the data on the F-PDCH is intended. A forward link scheduler provides rate control by scheduling packet data to the user who has the most favourable forward link channel condition.

In a full-queue situation in which network-side data buffers for all active users are always occupied, such an arrangement can provide significant multi-user diversity gain. However, in a more realistic non-full-queue situation in which active users' buffers are not always occupied by data, the multi-user diversity gain decreases significantly because an active user's buffer may be empty although the user has the most favourable channel condition.

In response to a user requesting a packet data communications session, the system transitions the user to an active state through dedicated or shared resource assignments. The system resources involved include a sub-channel of a forward link common power control channel or F-CPCCH, which the MS of an active user detects for the purpose of closed-loop reverse link power control, the F-PDCCH and F-PDCH referred to above, and reverse link dedicated channels R-PICH, R-CQICH, and R-ACKCH for control signalling required for supporting the forward link high rate data transmissions. When a user is in the active state, the MS sends a pilot on the reverse pilot channel R-PICH and feedback information including a channel condition (C/I or carrier-to-interference ratio report) indicating the quality of the forward link on the reverse channel quality indication channel R-CQICH, and an ACK/NAK (acknowledgement or negative acknowledgement) indication for an ARQ (automatic retransmission) function on the reverse acknowledgement channel R-ACKCH. This reverse link information is updated in each timeslot, i.e. at a rate of 800 Hz for a time slot duration of 1.25 ms. The sub-channel of the F-CPCCH is also detected at this time slot rate of for example 800 Hz.

Although it is conceivable to increase the number of active users thereby to increase the multi-user diversity gain in non-full-queue situations, the number of active users that can be supported is restricted by these limited system resources for overhead information for active users.

It is desirable to facilitate an increase in the number of active users without increasing the associated system resources for overhead information required for supporting active users.

SUMMARY OF THE INVENTION

Recognizing that a result of a typically bursty nature of packet data communications is that an active user's buffer may be empty for a significant portion of the time that the user is active, this invention arises from an appreciation that it is not necessary to perform reverse link power control at the full rate (the time slot rate of e.g. 800 Hz), and it is not necessary for an active user to send feedback information at the full rate. Instead, such an active user can operate in a lower rate mode, i.e. such information can be communicated at a reduced rate, and for channels that are shared among active users the resulting saving in system resources can enable more active users to be supported. Of course, it is also evident in this case that the feedback information need not include the R-ACKCH acknowledgements, because no packet data is being sent to the MS from the empty buffer.

The lower or reduced rate mode is also referred to as a control hold mode, but it is substantially enhanced compared with the known control hold mode referred to above. The latter only provides battery power saving, and does not involve or permit any increase in the number of active users that can be supported because the control channels are still dedicated to the active users. In contrast, embodiments of this invention not only facilitate battery power saving but also facilitate dynamic sharing of the system resources among active users so that more active users may be supported without requiring additional system resources, potentially resulting in an increased forward link throughput for the system as a whole.

According to one aspect of this invention there is provided a method of communicating control information in a wireless communications system, comprising the steps of: in a first state of a terminal for traffic communication with the terminal, communicating control information with the terminal at a first rate; in a second state of the terminal, communicating at least some of said control information at a second rate which is less than the first rate; and sharing a communication channel for the control information at the second rate for communicating control information among a plurality of terminals in the second state.

The control information communicated at the second rate in the second state of the terminal can comprise power control information for the terminal, and/or a pilot from the terminal, and/or a channel quality indication from the terminal. The second rate is desirably a sub-multiple, preferably ½, ¼, or ⅛, of the first rate.

Where the control information is communicated in time slots of at least one communication channel of the system, preferably control information at the first rate is communicated with a terminal in the first state in each time slot on the communication channel, and control information at the second rate is communicated with a terminal in the second state in only one of every N time slots on the communication channel, where N is an integer greater than one. Conveniently N is a power of 2, for example N=2, 4, or 8.

The method can include the step of switching between the first and second states of the terminal in dependence upon whether or not a data buffer for traffic communication with the terminal is empty.

Another aspect of the invention provides a method of communicating control information in a wireless communications system having forward and reverse channels for communicating traffic and control information with a plurality of terminals, the forward channels including a time division multiplexed (tdm) channel for communicating traffic in respective time slots to respective terminals, and the reverse channels including channels for communicating pilot and feedback information from the terminals, the method comprising the steps of: in a first state of a terminal for receiving traffic for the terminal in respective time slots of the tdm channel, communicating said pilot and feedback information at a first rate; in a second state of the terminal, communicating said pilot and feedback information at a second rate which is less than the first rate; and sharing the channels for communicating said pilot and feedback information at the second rate among a plurality of terminals in the second state.

Conveniently the first rate is equal to a rate of said time slots and the second rate is ½, ¼, or ⅛ of the first rate.

Preferably in this method the forward channels include a power control channel for controlling, at the first rate, power on the reverse channels of a respective terminal in the first state, the method further comprising the step of using the power control channel for controlling, at the second rate, power on the reverse channels of a plurality of terminals in the second state.

Preferably the forward channels include a control channel for identifying, for each time slot of the tdm channel, a terminal to which traffic in the time slot is being communicated, and the terminals monitor said control channel at said first rate in both the first and second states. This method can include the step of switching a terminal from the second state to the first state in response to identification of said terminal on said control channel. The method can also include the step of switching between the first and second states of the terminal in dependence upon whether or not a data buffer, for traffic communication with the terminal via the tdm channel, is empty.

Another aspect of the invention provides a terminal for use in a wireless communications system, the terminal being operable in a first state to receive traffic for the terminal in respective time slots of a tdm channel of the system and to communicate pilot and feedback information at a first rate, and being operable in a second state to communicate said pilot and feedback information at a second rate which is less than the first rate, the terminal further being operable in the first and second states to monitor a control channel of the system to identify, for each time slot of the tdm channel, traffic in the time slot communicated to the terminal, and in response to such identification in the second state to switch to the first state.

Desirably the terminal is further operable in said first state to receive and respond to power control information at the first rate and in said second state to receive and respond to power control information at the second rate.

According to another aspect, this invention provides apparatus for use in a wireless communications system having forward and reverse channels for communicating traffic and control information with a plurality of terminals, the forward channels including a time division multiplexed (tdm) channel for communicating traffic in respective time slots to respective terminals, and the reverse channels including channels for communicating pilot and feedback information from the terminals, wherein the apparatus is operable to receive said pilot and feedback information from each of a plurality of terminals in a first state at a first rate, and to receive said pilot and feedback information from each of a plurality of terminals in a second state, at a second rate which is less than the first rate, via a channel shared by said plurality of terminals in the second state.

Desirably the apparatus is further operable to supply power control information, via a shared power control channel, at the first rate to terminals in said first state and at the second rate to terminals in said second state.

A further aspect of the invention provides a method for transmitting control information from a network apparatus to a plurality of mobile stations via a common control channel, the method comprising: transmitting control information to a first set of mobile stations at a first rate of transmission via the common control channel; and transmitting control information to a second set of mobile stations at a second rate of transmission via the common control channel, the second rate of transmission being less than the first rate of transmission. The common control channel can be a common power control channel.

According to another aspect, the invention provides a wireless communications system comprising: first and second sets of mobile stations; and an apparatus that operates to transmit control information to, and/or to receive control information from, the first and second sets of mobile stations at respective first and second rates of transmission via a shared control channel, the second rate of transmission being less than the first rate of transmission. The shared control channel can comprise a power control channel for controlling power of the mobile stations.

BRIEF DESCRIPTION OF THE DRAWINGS

The invention will be further understood from the following description by way of example with reference to the accompanying drawings, in which.

DETAILED DESCRIPTION

Figure 1:
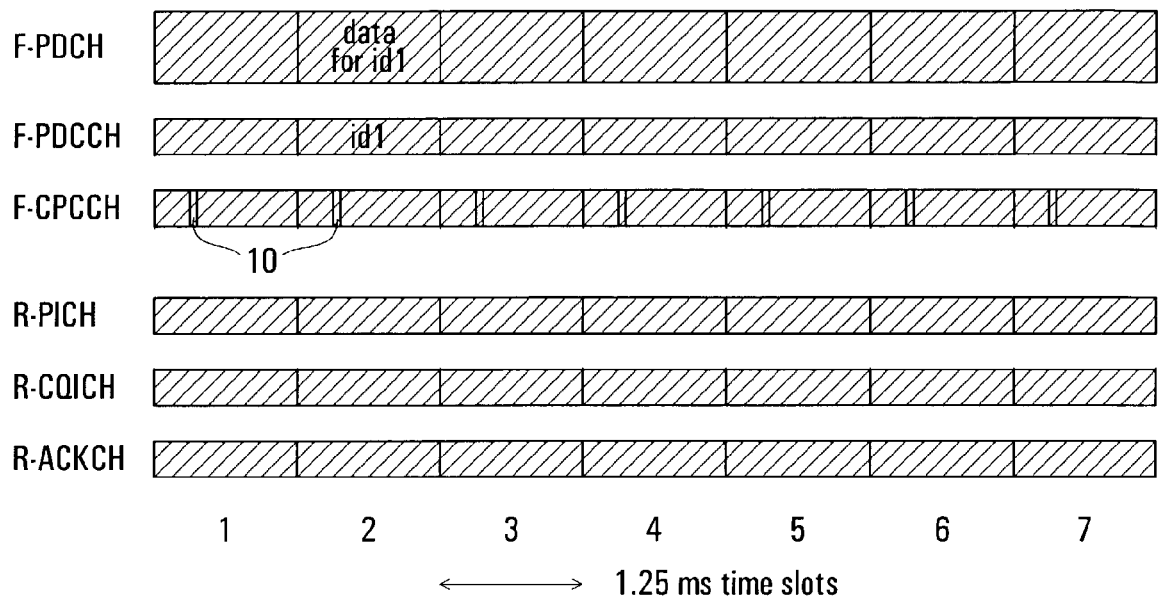
FIGS. 1 and 2 represent information in communications channels of a wireless communications system in accordance with an embodiment of the invention, for a plurality of time slots and respectively for an active state and for a control hold state of an active user.

In an embodiment of the invention described in detail below with reference to the drawings, an active user can be in an active state or a control hold state. The active state of an active user is also referred to as a primary active state, and the control hold state of an active user is also referred to as a secondary active state. The control hold state generally corresponds to situations in which there is temporarily no packet data being communicated between the BS and the MS of an active user, i.e. in which data buffers are empty. Transitions between the active state and the control hold state can therefore be dependent upon whether or not data buffers are empty, or can be directed by the system.

An active user in this embodiment of the invention refers to a mobile station (MS), and the description below refers particularly to high rate packet data communications to the MS on the forward link from a base station (BS), and power control for communications on the reverse link from the MS to the BS. However, it can be appreciated that these particulars are provided by way of example and not limitation, and that the invention can also be applied to other shared communications channels for traffic and/or control (including feedback, pilot, and any other overhead) information in either direction or in both directions between base stations and remote terminals.

In the described embodiment of the invention, forward and reverse link channels and system resources provided for supporting the forward link packet data communications to an active user with a packet session connected include the forward link channels F-PDCH, F-PDCCH, and F-CPCCH, the reverse link channels R-PICH, R-CQICH, and R-ACKCH, and the identifier MAC_ID, as discussed in the Background above. It is observed that the channel F-PDCH could instead be any data channel shared in a time division multiplexed manner by active users, and the channel F-PDCCH could instead be any shared control channel for conveying to the active users information required for detecting their respective data on the shared data channel. In addition, in the described embodiment of the invention the common power control channel F-CPCCH is assumed to be defined in a manner similar to that of known cdma2000 systems, with 24 bits in each time slot, so that a respective bit in successive time slots can constitute a sub-channel for controlling reverse link power of a respective MS.

Also in the described embodiment of the invention it is assumed that the time slot duration is 1.25 ms, the time slots having a rate of 800 Hz which is referred to as the full rate. Other, lower, rates referred to below are conveniently sub-multiples of the full rate, for example ½ (half), ¼ (quarter), and ⅛ (eighth) rates being 400, 200, and 100 Hz respectively and corresponding to one in every two, four, and eight time slots respectively. However, it can be appreciated that these parameters are given only by way of example.

The MS of an active user in the active state operates at the full rate, continuously monitoring the F-PDCCH (shared control channel) for its identifier MAC_ID to determine when it should detect data on the F-PDCH, and monitoring its assigned sub-channel of the F-CPCCH at the full rate (one bit per time slot of the common power control channel) for power control of its transmissions on the reverse link. It also sends feedback information on the reverse link, i.e. the R-PICH, R-CQICH, and R-ACKCH channels, at the full rate of 800 Hz. These full rate communications to and from the MS are known in the art and are not further described here.

The MS of an active user in the control hold state operates in several respects at a reduced or lower rate, for example at a selected one of the ½, ¼, and ⅛ rates already mentioned. More particularly, in the control hold state the MS still continuously monitors the F-PDCCH (shared control channel) for its identifier MAC_ID, but it can monitor the F-CPCCH at the reduced rate as described below. In addition, it sends its pilot and feedback information on the reverse link channels R-PICH and R-CQICH at the reduced rate, and does not send any acknowledgements on the R-ACKCH channel because in the control hold state there is no received data to be acknowledged.

It can be appreciated that the greatest advantages are provided by adopting reduced rates for all channels on the forward link and on the reverse link for which such reduced rates are possible. However, this need not be the case and reduced rates may be adopted for only some of these channels. For example, it can be appreciated that reduced rates may be adopted for the reverse link channels without also adopting a reduced rate for the F-CPCCH on the forward link. In addition, it can be appreciated that different reduced rates may be adopted for different active users, and/or at different times for the same active user.

As a result of the reduced rates used in the control hold state, in accordance with embodiments of this invention system resources that previously could be used by only one active user can be shared by a plurality of active users each in the control hold state, so that a greater total number of active users can be simultaneously supported by the system. Transitions between the active state and the control hold state for each active user can take place relatively rapidly (compared with switching between idle and active states), as described further below.

Referring to FIG. 1, information in the shared forward link channels F-PDCH, F-PDCCH, and F-CPCCH referred to above, and in the reverse link channels R-PICH, R-CQICH, and R-ACKCH dedicated to an individual active user in the active state, is represented by hatching for a plurality of time slots numbered 1 to 7. As described above, the MS in the active state continuously monitors the F-PDCCH for its assigned MAC_ID, for example id1 in the time slot 2 in FIG. 1, and detects and decodes the data in the corresponding time slot of the high rate packet data channel F-PDCH, "data for id1" in FIG. 1. The other time slots of these shared channels as shown in FIG. 1 contain data and identities for other active users which are in the active state.

The MS in the active state also continuously monitors the shared F-CPCCH, to detect in an assigned one of (in this embodiment) 24 bit positions in each time slot the bits 10 of the power control sub-channel for this MS, and uses this information in known manner to control the power of its transmissions on the reverse link channels.

As illustrated in FIG. 1, the MS in the active state transmits its pilot and feedback information in each time slot in the dedicated reverse link channels.

Figure 2:
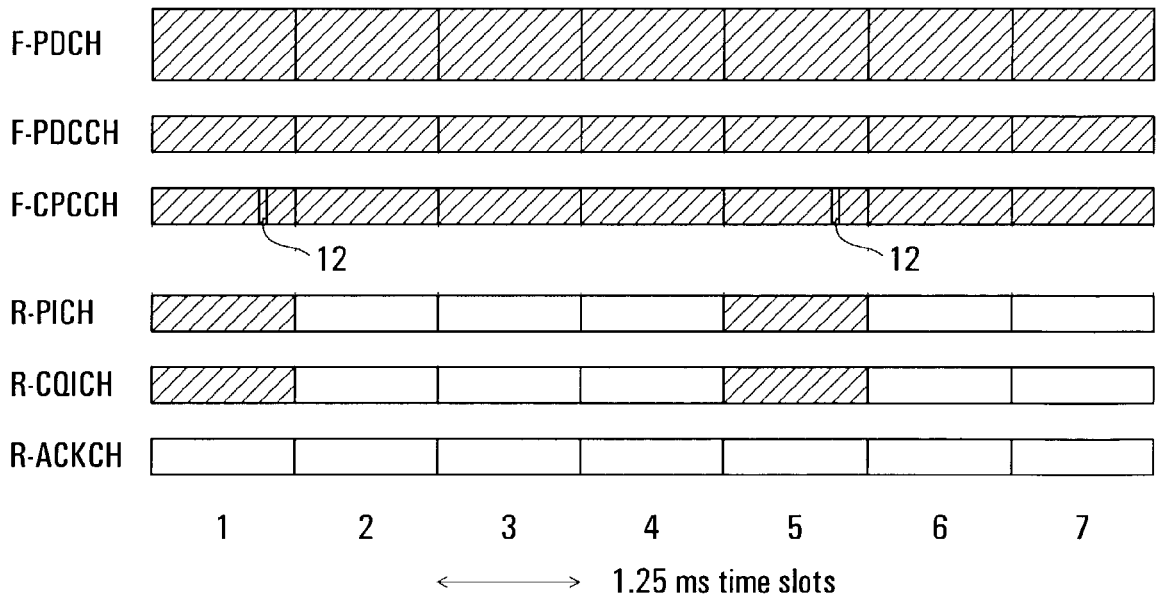

FIG. 2 similarly illustrates by hatching information in the shared forward link channels F-PDCH, F-PDCCH, and F-CPCCH, and in the reverse link channels R-PICH, R-CQICH, and R-ACKCH of an individual active user in the control hold state, for a plurality of time slots also numbered 1 to 7. As described above, the MS in the control hold state continuously monitors the F-PDCCH for its assigned MAC_ID, which in this case is not present because no data for the MS is present on the F-PDCH, the information on each of these shared channels relating to other users.

For an MS in the control hold state, the shared F-CPCCH contains power control information for the MS at a reduced rate of ¼ as shown in FIG. 2, in bits 12 of every fourth time slot. The MS in the control hold state monitors only these bits of the reduced rate power control sub-channel assigned to it as further described below, and uses this information in known manner to control the power of its transmissions on the reverse link channels. The same bits in other time slots can be used for other MSs in the control hold state, thereby increasing the number of active users for which power control can be supported. Other bits in the time slots of the F-CPCCH are used for power control of other MSs of active users either in the active state as described above or similarly in the control hold state.

As also illustrated in FIG. 2, the MS in the control hold state does not transmit any acknowledgements on the R-ACKCH because there is no data to be acknowledged, and transmits its pilot and channel quality feedback information on the channels R-PICH and R-CQICH at the same reduced rate of ¼, in this case in the time slots numbered 1 and 5. The same reverse link channels can be simultaneously used, in the other time slots and at the same or a different reduced rate, by the MSs of other active users in the control hold state, thereby also facilitating an increase of the number of active users that can be supported without additional system resources.

Figure 3:
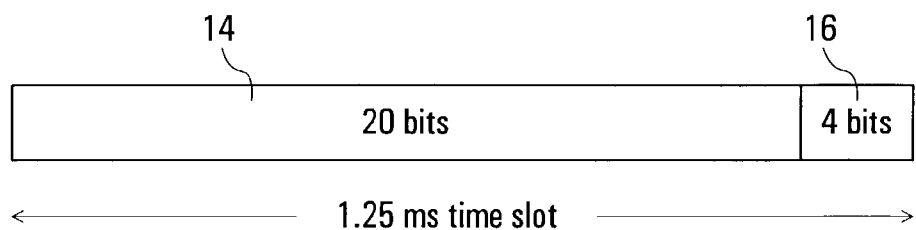
FIGS. 3, 4, and 5 illustrate configurations of power control information in a time slot of a common power control channel.
Figure 4:
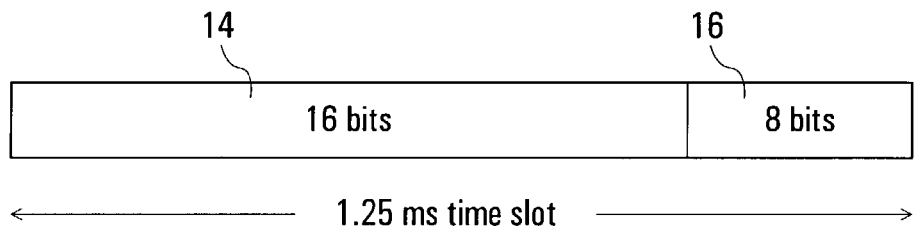
Figure 5:
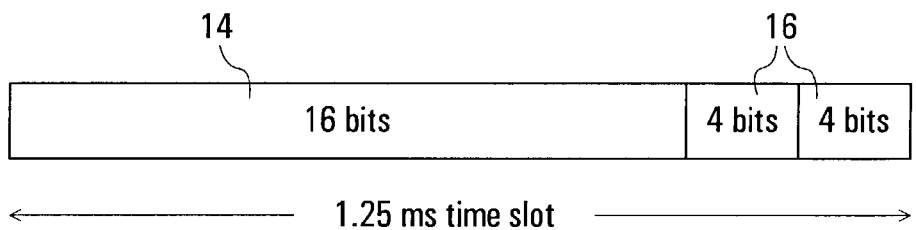

FIGS. 3, 4, and 5 illustrate by way of example three possible fixed configurations of the information in each time slot of the F-CPCCH, which is divided into different fields 14 and 16 for power control for MSs in the active state and in the control hold state respectively. It can be appreciated that other fixed configurations can be used, and/or the configuration can be changed dynamically for example in dependence upon the real time traffic load of active users in the system, with updated configuration information being sent on a shared control channel such as the F-PDCCH.

In the configuration of FIG. 3, the field 14 contains 20 bits to provide power control sub-channels for 20 MSs in the active state, in known manner with one bit per user in each time slot as described above. The field 16 contains the remaining 4 bits in each time slot, each bit being used to provide power control for different MSs in the control hold state in the reduced rate manner described above. For example if the reduced rate is ⅛, then in a 10 ms cycle of 8 time slots this field provides one bit for power control of each of 32 MSs in the control hold state, so that the F-CPCCH can support a total of 52 active users.

In the configuration of FIG. 4, the field 14 contains 16 bits to provide power control sub-channels for 16 MSs in the active state, in known manner with one bit per user in each time slot as described above. The field 16 contains the remaining 8 bits in each time slot, each bit being used to provide power control for different MSs in the control hold state in the reduced rate manner described above. For example if the reduced rate is ¼, then in a 5 ms cycle of 4 time slots this field provides one bit for power control of each of 32 MSs in the control hold state, so that the F-CPCCH can support a total of 48 active users.

In the configuration of FIG. 5, the field 14 also contains 16 bits to provide power control sub-channels for 16 MSs in the active state, in known manner with one bit per user in each time slot. The field 16 contains the remaining 8 bits in each time slot, each bit being used to provide power control for different MSs in the control hold state in the reduced rate manner described above, using 4 bits for power control of MSs operating at each of two alternative reduced rates. For example if the two alternative reduced rates are ⅛ and ¼, then this field provides bits for power control of each of 4(4+8)=48 MSs in the control hold state, so that the F-CPCCH can support a total of 64 active users.

Any of a number of different techniques may be used to switch an MS of an active user between the active state and the control hold state. For example, switching from the active state to the control hold state can be dependent, immediately or after a small delay, upon a data buffer at the BS for an active user becoming empty, and switching from the control hold state to the active state can be dependent upon the data buffer ceasing to be empty and/or the data buffer occupancy being higher than a certain threshold. Such switching can be implemented using Layer 2 and/or Layer 3 messaging or signalling.

For example, in an embodiment of the invention, if a data buffer, for sending data on the forward link to an MS in the active state, becomes empty as a result of a data packet being sent from the BS to the MS, the Layer 2 frame header of this packet can include a buffer empty indication (1 bit) and information (a mode control field) regarding the control hold state. In response to receipt of the forward link buffer empty indication, the MS in the active state replies by indicating whether or not the sending data buffer at the MS is also empty. If it is empty, the active user is switched from the active state to the control hold state immediately after the response from the MS is received. Otherwise, the MS remains in the active state.

Alternatively, a timer can be set with a very small value when the data buffer for sending data to the MS in the active state becomes empty. When the set time ends, or at any other time that the network considers appropriate, the network can for example send a control message in the Layer 2 frame header to explicitly request the MS to switch to the control hold mode. Alternatively, Layer 3 signaling can be used to trigger a switch of an active user from the active state to the control hold state.

By way of example of a mode control field in the Layer 2 frame header as mentioned above, such a mode control field can comprise a time slot indicator and a sub-channel indicator, and optionally a reduced rate indicator. For example, for the configuration described above with reference to FIG. 3 with a reduced rate of ⅛, the time slot indicator may comprise 3 bits to indicate which time slot, in a sequence of 8 time slots in the 10 ms cycle, is to be used by the MS in the control hold state, and the sub-channel indicator may comprise 2 bits to indicate which of the 4 bits of the field 16 is to be used by the MS for its reduced rate power control sub-channel.

Similarly, for the configuration described above with reference to FIG. 4 with a reduced rate of ¼, the time slot indicator may comprise 2 bits to indicate which time slot, in a sequence of 4 time slots in the 5 ms cycle, is to be used by the MS in the control hold state, and the sub-channel indicator may comprise 3 bits to indicate which of the 8 bits of the field 16 is to be used by the MS for its reduced rate power control sub-channel.

Also, for the configuration described above with reference to FIG. 5 with alternative reduced rates of ⅛ and ¼, there may be a 1-bit reduced rate indicator to indicate to the MS which of the two reduced rates is to be used, the time slot indicator may comprise 2 or 3 bits to indicate which time slot, in a sequence of either 4 or 8 time slots for the ¼ and ⅛ reduced rates respectively, is to be used by the MS, and the sub-channel indicator may comprise 2 bits in each case to indicate which of the respective 4 bits of the field 16 is to be used by the MS for its reduced rate power control sub-channel.

Thus it can be appreciated that the configuration information on the F-PDCCH and the mode control field on the F-PDCH together provide the MS of an active user with rules for its operation in the control hold state.

It can be appreciated that this information can be reduced if the MS operates at a reduced rate in the control hold state for only some of the possible reduced rate channels discussed above. For example, in the event that the common power control channel F-CPCCH is monitored continuously in the control hold state of an MS, as described above with reference to FIG. 1, even though the reduced rate monitoring of this channel could be adopted as described above with reference to FIG. 2, the mode control field discussed above need not necessarily contain an F-CPCCH sub-channel indicator (for example, the power control sub-channel previously assigned to the MS in the active state may continue to be used in the control hold state). In this case, in the same manner as described above, the time slot indicator and optional reduced rate indicator can inform the MS which time slots to use for the reduced rate information on the R-PICH and R-CQICH as described above with reference to FIG. 2.

A BS can send data to an MS in the control hold state at any time, causing the MS to switch to the active state, because the MS continuously monitors the shared control channel F-PDCCH. Thus in response to the sending data buffer, for an active user whose MS is in the control hold state, becoming non-empty, the BS can send data to the MS immediately on the F-PDCH, using parameters (such as data rate and modulation scheme) determined from the most recent R-CQICH information from the MS. A control field of for example 5 bits can be inserted into the header of the Layer 2 frame which encapsulates the first data packet, in order to inform the MS which sub-channel (i.e. which bit in each time slot) of the F-CPCCH it should monitor once it is in the active state, and the BS starts to send this power control sub-channel at the full rate at the same time. The MS detects its MAC_ID in the F-PDCCH which it has continued to monitor in the control hold state, and in response switches to the active state and detects and decodes the packet data intended for it on the F-PDCH. Accordingly, the MS now in the active state sends its R-PICH, R-CQICH, and R-ACKCH at the full rate as described above and shown in FIG. 1. In conventional manner, the BS re-sends packet data for which it receives a NAK or no acknowledgement within a certain time period.

Alternatively, an MS in the control hold state can be switched to the active state by simultaneous transmission to it of a data packet and Layer 3 signaling sent in an assured mode, the MS accordingly returning to full rate transmission of its channels R-PICH, R-CQICH, and R-ACKCH.

Figure 6:
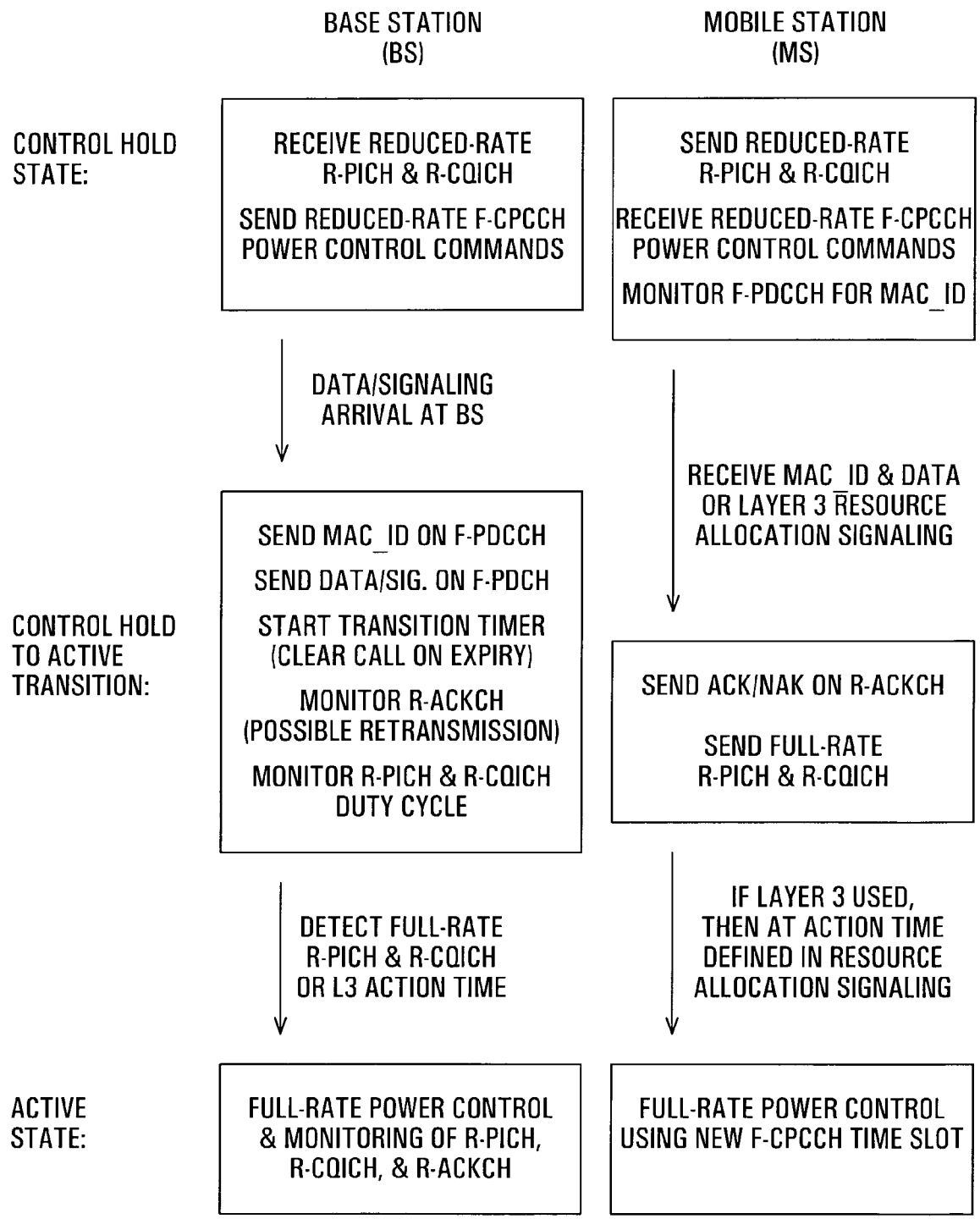
FIG. 6 illustrates a simplified state diagram for a base station and a mobile station in a control hold state and for a transition to an active state.

FIG. 6 illustrates a state diagram for a BS and an MS, illustrating operations in the control hold state, the active state, and for a transition from the control hold state to the active state initiated by data for the MS arriving at the BS, or by Layer 3 signaling. It can be appreciated that this provides a simplified illustration by way of example of the respective states and transitions, and that transitions from the active state to the control hold state, and transitions requested by the MS, can be similarly illustrated.

As shown in FIG. 6, and as described above, in the control hold state for the MS of an active user the BS receives the reduced-rate (also referred to as gated) reverse link channels R-PICH and R-CQICH which are sent by the MS. Also as described above, in this state the BS advantageously sends reduced-rate power control commands on the F-CPCCH, and these are received by the MS. The MS also continuously (i.e. at the full rate) monitors the F-PDCCH for its assigned MAC_ID, to determine if and when there is data for the MS on the F-PDCH.

In response to data for the MS arriving at the BS (the sending data buffer for the MS becomes non-empty), or Layer 3 signaling, the BS proceeds to a transition phase from the control hold state to the active state for the MS. As shown in FIG. 6, in this transition phase the BS sends the data or signaling on the F-PDCH (and correspondingly sends the MAC_ID for the MS on the F-PDCCH as described above), starts a transition timer, and monitors the channel R-ACKCH for an acknowledgement of the data packet sent, with possible retransmission in the event that no ACK is received within a timeout period. In the event that the transition timer expires, the BS proceeds to a call clearing procedure. Also in the transition phase the BS monitors the duty cycle of the R-PICH and R-CQICH to detect a transition from the reduced-rate (gated) transmission to full rate transmission of these channels by the MS.

Correspondingly, the MS detects its MAC_ID on the F-PDCCH and receives the corresponding data or signaling on the F-PDCH. Consequently, in the transition phase the MS resumes sending the R-PICH, R-CQICH, and R-ACKCH at the full rate, and sends an acknowledgement on the R-ACKCH.

On detection of the full-rate R-PICH and R-CQICH, or, in the case of Layer 3 signaling, at an action time determined by this signaling, the BS resumes full-rate transmission of power control commands for the MS via the F-CPCCH in a new time slot or power control sub-channel, and the MS uses this full-rate power control accordingly. In addition, the BS resumes continuous or full-rate monitoring of the reverse link channels R-PICH, R-CQICH, and R-ACKCH.

Although embodiments of the invention are described above in the context of a particular type of wireless communications system and for particular channels such as a power control channel, pilot channel, and channel quality feedback channel, it should be understood that the invention is not limited to these and can be applied to any of these channels and/or other channels, in this or and/or other types of system.

Thus although particular embodiments of the invention and variations have been described above in detail, it can be appreciated that numerous modifications, variations, and adaptations may be made within the scope of the invention as defined in the claims.

The invention claimed is:

1. A method of communicating control information in a wireless communications system, comprising the steps of:
   in a first state of a terminal for traffic communication with the terminal, communicating control information with the terminal at a first rate;
   in a second state of the terminal, communicating at least some of said control information at a second rate which is less than the first rate; and
   sharing a communication channel for the control information at the second rate for communicating control information among a plurality of terminals in the second state,
   wherein the control information is communicated in time slots of at least one communication channel of the system, wherein control information at the first rate is communicated with a terminal in the first state in each time slot on the communication channel, and wherein control information at the second rate is communicated with a terminal in the second state in only one of every N time slots on the communication channel, where N is an integer greater than one.

2. A method as claimed in claim 1 wherein the control information communicated at the second rate in the second state of the terminal comprises power control information for the terminal.

3. A method as claimed in claim 1 wherein the control information communicated at the second rate in the second state of the terminal comprises a pilot from the terminal.

4. A method as claimed in claim 1 wherein the control information communicated at the second rate in the second state of the terminal comprises a channel quality indication from the terminal.

5. A method as claimed in claim 1 wherein the control information communicated at the second rate in the second state of the terminal comprises a pilot and a channel quality indication from the terminal.

6. A method as claimed in claim 1 wherein the second rate is a sub-multiple of the first rate.

7. A method as claimed in claim 1 and including the step of switching between the first and second states of the terminal in dependence upon whether or not a data buffer for traffic communication with the terminal is empty.

* * * * *